US012659401B2

(12) United States Patent
Ruvalcaba et al.

(10) Patent No.: US 12,659,401 B2
(45) Date of Patent: Jun. 16, 2026

(54) DISABLEMENT AND RECOVERY FOR LOST OR STOLEN USER DEVICE

(71) Applicant: QUALCOMM Incorporated, San Diego, CA (US)

(72) Inventors: Jose Alfredo Ruvalcaba, Poway, CA (US); Asaf Shen, Irvine, CA (US); Gabriel Moura da Silva, San Diego, CA (US); Tom Chin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 477 days.

(21) Appl. No.: 17/804,415

(22) Filed: May 27, 2022

(65) Prior Publication Data

US 2023/0388410 A1 Nov. 30, 2023

(51) Int. Cl.
*H04M 1/72463* (2021.01)
*H04W 4/029* (2018.01)
*H04W 8/18* (2009.01)

(52) U.S. Cl.
CPC ....... *H04M 1/72463* (2021.01); *H04W 4/029* (2018.02); *H04W 8/183* (2013.01)

(58) Field of Classification Search
None
See application file for complete search history.

(56) References Cited

U.S. PATENT DOCUMENTS

| | | | | |
|---|---|---|---|---|
| 2009/0183266 A1* | 7/2009 | Tan | | G06F 21/88 |
| | | | | 726/35 |
| 2011/0072520 A1* | 3/2011 | Bhansali | | G06F 21/602 |
| | | | | 726/26 |

| | | | | |
|---|---|---|---|---|
| 2011/0076986 A1* | 3/2011 | Glendinning | | H04M 1/675 |
| | | | | 455/411 |
| 2015/0050945 A1* | 2/2015 | Samuel | | H04W 64/00 |
| | | | | 455/456.1 |
| 2017/0280364 A1* | 9/2017 | Lu | | H04W 12/126 |
| 2017/0359682 A1 | 12/2017 | Madsen | | |
| 2018/0242155 A1* | 8/2018 | Marass | | H04W 4/50 |
| 2019/0110251 A1* | 4/2019 | de Barros Chapiewski | | |
| | | | | G01S 19/14 |
| 2020/0221260 A1 | 7/2020 | Mahmoud et al. | | |
| 2021/0037389 A1* | 2/2021 | Mbonye | | H04W 12/06 |
| 2022/0104005 A1* | 3/2022 | Xiong | | H04W 12/45 |
| 2022/0256308 A1* | 8/2022 | Volkerink | | H04W 4/021 |
| 2025/0005211 A1* | 1/2025 | Kuravangi-Thammaiah | | |
| | | | | G06F 21/53 |

FOREIGN PATENT DOCUMENTS

| | | | | |
|---|---|---|---|---|
| WO | WO-0045243 A1 * | 8/2000 | | G06F 21/88 |

OTHER PUBLICATIONS

International Search Report and Written Opinion—PCT/US2023/023564—ISA/EPO—Aug. 25, 2023.

* cited by examiner

*Primary Examiner* — German Viana Di Prisco

(74) *Attorney, Agent, or Firm* — Harrity & Harrity, LLP

(57) ABSTRACT

Various aspects of the present disclosure generally relate to wireless communication. In some aspects, a user device may retrieve, from a server, an indication of a current device state of the user device. The user device may disable communication capabilities of the user device in connection with a determination that the current device state is a first device state of a plurality of device states. Numerous other aspects are described.

28 Claims, 9 Drawing Sheets

510 Retrieve an indication of a current device state of the user device

520 Disable communication capabilities of the user device in connection with a determination that the current device state is a first device state of a plurality of device states

500

DISABLEMENT AND RECOVERY FOR LOST OR STOLEN USER DEVICE

FIELD OF THE DISCLOSURE

Aspects of the present disclosure generally relate to wireless communication and to techniques and apparatuses for disablement and recovery for lost or stolen user device.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a user device for wireless communication. The user device may include a memory and one or more processors coupled to the memory. The one or more processors may be configured to retrieve, from a server, an indication of a current device state of the user device. The one or more processors may be configured to disable communication capabilities of the user device in connection with a determination that the current device state is a first device state of a plurality of device states.

Some aspects described herein relate to a method of wireless communication performed by a user device. The method may include retrieving, from a server, an indication of a current device state of the user device. The method may include disabling communication capabilities of the user device in connection with a determination that the current device state is a first device state of a plurality of device states.

Some aspects described herein relate to a non-transitory computer-readable medium that stores a set of instructions for wireless communication by a user device. The set of instructions, when executed by one or more processors of the user device, may cause the user device to retrieve, from a server, an indication of a current device state of the user device. The set of instructions, when executed by one or more processors of the user device, may cause the user device to disable communication capabilities of the user device in connection with a determination that the current device state is a first device state of a plurality of device states.

Some aspects described herein relate to an apparatus for wireless communication. The apparatus may include means for retrieving, from a server, an indication of a current device state. The apparatus may include means for disabling communication capabilities in connection with a determination that the current device state is a first device state of a plurality of device states.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
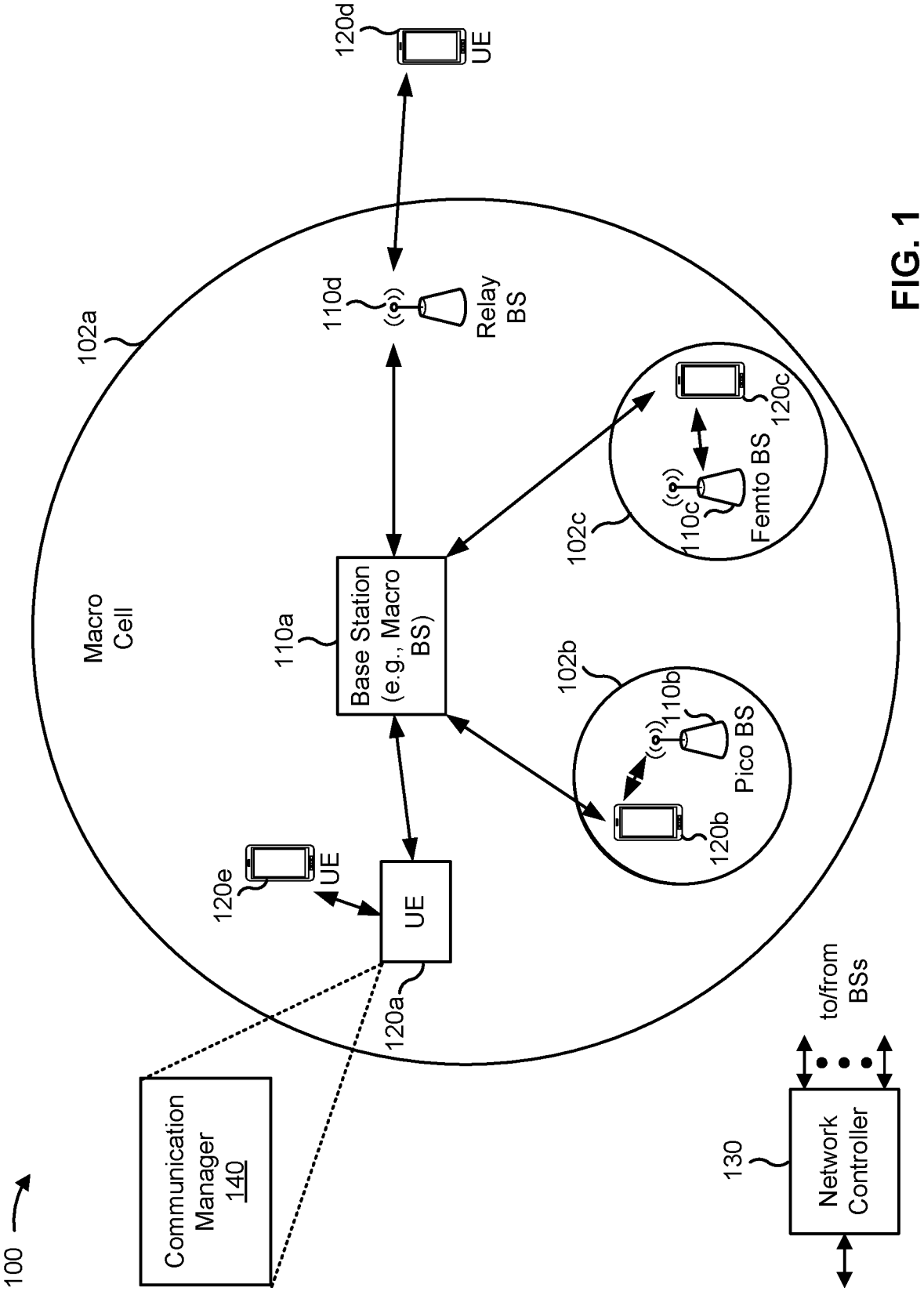
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, a base station, or a network equipment may be implemented in an aggregated or disaggregated architecture. For example, a base station (such as a Node B (NB), evolved NB (eNB), NR base station (BS), 5G NB, gNodeB (gNB), access point (AP), TRP, or cell), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more central units (CUs), one or more distributed units (DUs), one or more radio units (RUs), or a combination thereof).

An aggregated base station may be configured to utilize a radio protocol stack that is physically or logically integrated within a single RAN node (for example, within a single device or unit). A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also may be implemented as virtual units (e.g., a virtual central unit (VCU), a virtual distributed unit (VDU), or a virtual radio unit (VRU)).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that may be individually deployed. A disaggregated base station may include functionality implemented across two or more units at various physical locations, as well as functionality implemented for at least one unit virtually, which may enable flexibility in network design. The various units of the disaggregated base station may be configured for wired or wireless communication with at least one other unit of the disaggregated base station.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicleto-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a user device, such as a UE 120, may include a communication manager 140. As described in more detail elsewhere herein, the communication manager 140 may retrieve, from a server, an indication of a current device state of the user device; and disable communication capabilities of the user device in connection with a determination that the current device state is a first device state of a plurality of device states. Additionally, or alternatively, the communication manager 140 may perform one or more other operations described herein.

As indicated above, FIG. 1 is provided as an example. Other examples may differ from what is described with regard to FIG. 1.

Figure 2:
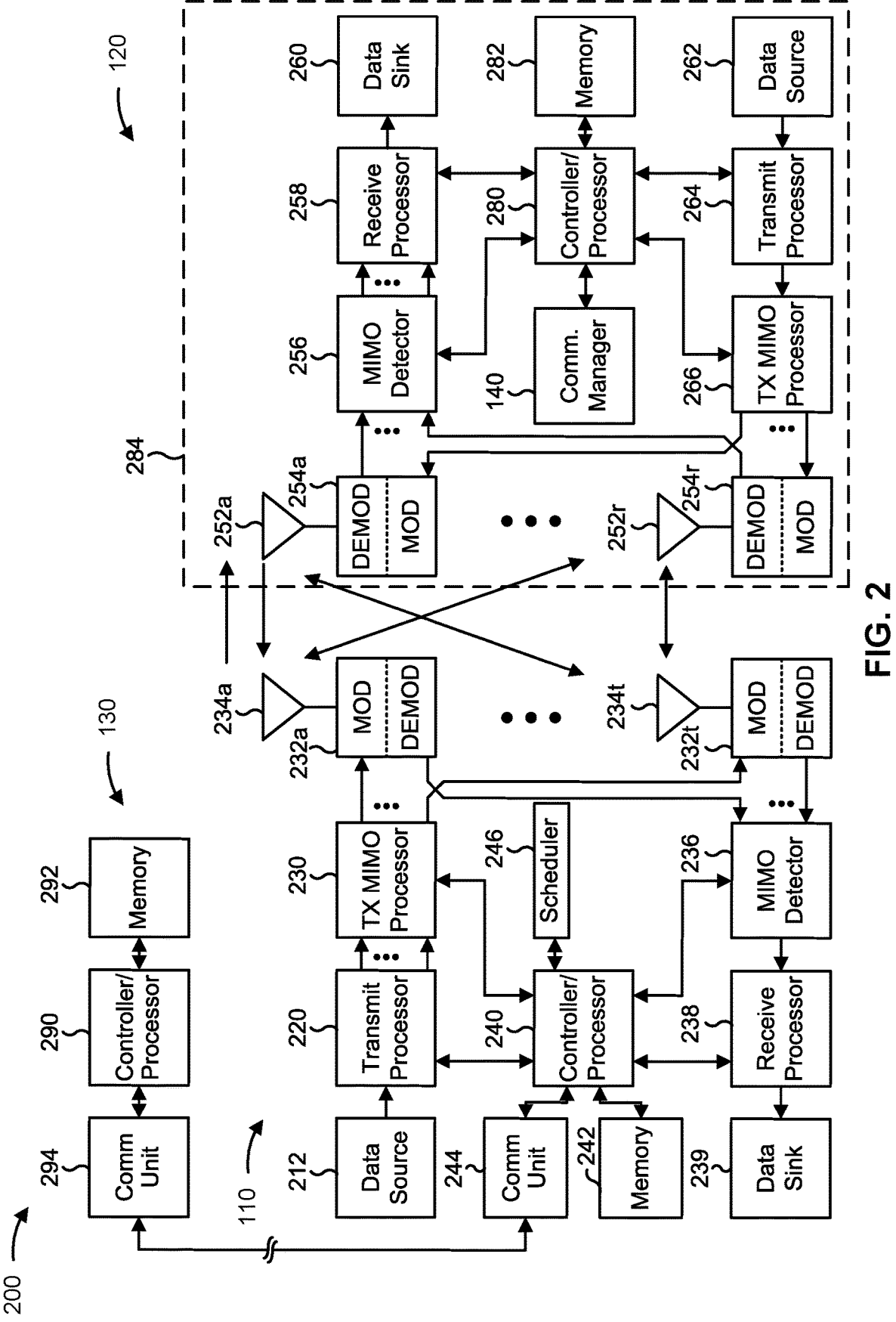
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3A-3D, 4, 5, and 6).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3A-3D, 4, 5, and 6).

The controller/processor 240 of the base station 110, the controller/processor 280 of the UE 120, and/or any other component(s) of FIG. 2 may perform one or more techniques associated with disablement and recovery for a lost or stolen user device, as described in more detail elsewhere herein. For example, the controller/processor 240 of the base station 110, the controller/processor 280 of the UE 120, and/or any other component(s) of FIG. 2 may perform or direct operations of, for example, process 400 of FIG. 4, process 500 of FIG. 5, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 400 of FIG. 4, process 500 of FIG. 5, and/or other processes as described herein. In some examples, executing instructions may include running the instructions, converting the instructions, compiling the instructions, and/or interpreting the instructions, among other examples. In some aspects, the user device described herein is the UE 120, is included in the UE 120, or includes one or more components of the UE 120 shown in FIG. 2.

In some aspects, the user device includes means for retrieving, from a server, an indication of a current device state of the user device; and/or means for disabling communication capabilities of the user device in connection with a determination that the current device state is a first device state of a plurality of device states. In some aspects, the means for the user device to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

A user device (e.g., a UE 120) may include a subscriber identity module (SIM) interface that accommodates a SIM card. A SIM card may include an integrated circuit that securely stores an international mobile subscriber identity (IMSI) and a related security key, which are used to identify and authenticate a corresponding subscription associated with the SIM card. The subscription associated with the SIM card may be activated to enable the user device to access a network. In some examples, a SIM card may store a list of services that the user device has permission to access using the subscription associated with the SIM card, such as data service or voice serve, among other examples.

In some cases, a user may lose a user device, or a user device may be stolen. When a user device is lost or stolen, the user device may be repurposed, with no way for the original user of the user device to recover the device. For example, the SIM card may be removed from the user device, and the user device may operate in a Wi-Fi only mode without acquiring cellular (e.g., 4G, 5G, or the like) network service. Theft deterrents on a user device may include a SIM lock and/or a screen lock, among other examples. However, such theft deterrents are often circumvented. Furthermore, theft deterrents that rely on applications running a non-secure environment (e.g., a high level operating system (HLOS)) may be vulnerable to attack in order to circumvent the theft deterrents. User device recovery applications (e.g., "find my phone" applications) may rely on global positioning system (GPS), which may be manually disabled on a user device. In some examples, a user device may store sensitive, important, and/or private data. In such examples, the user may lose the data stored on the user device and/or the data stored on the user device may no longer be private.

Some techniques and apparatuses described herein enable a user device to retrieve, from a server, an indication of a current device state of the user device. The user device, in connection with a determination that the current device state is a first device state of a plurality of device states, may disable communication capabilities of the user device. For example, the first device state may be a device state associated with a lost or stolen user device. In some aspects, the user device may disable communication capabilities, including one or more SIM interfaces, Wi-Fi, global navigation satellite system (GNSS) (e.g., GPS), Bluetooth, peripheral connections (e.g., universal serial bus (USB) ports), and/or other communication capabilities. As a result, an indication of the first device state on the server may remotely cause the user device to disable the communication capabilities of the user device. This may be prevent the user device from being repurposed for a new user, which may deter theft of user devices and repurchasing of stolen user devices.

In some aspects, the user device may include an integrated SIM, and the user device may activate a subscription associated with the integrated SIM to provide network connectivity for the user device in order to communicate with the server (e.g., to retrieve the device state), even in cases in which the communication capabilities have been disabled or a SIM card has been removed from the user device. The user device may temporarily enable communication capabilities and/or peripherals (e.g., GNSS or GPS) to obtain information (e.g., the location of the user device), and transmit the information to the server. The user device may then disable the communication capabilities and/or peripherals of the used device again. In this way, the chances of the user finding or recovering the user device may be increased, even with the communication capabilities of the user device disabled to prevent repurposing of the user device.

In some aspects, in a case in which the communication capabilities of the user device have been disabled, the user device may temporarily activate the subscription associated with the integrated SIM to provide network connectivity to the user device, and the user device may retrieve, from the server, an indication of an updated device state of the user device using the network connectivity provided by temporarily activating the subscription associated with the integrated SIM of the user device. The user device, in connection with a determination that the updated device state is a second device state of the plurality of device states, may enable the communication capabilities of the user device. In this case, the second device state may a "normal" device state associated with the user device not being lost or stolen. For example, the device state on the server may be updated to the second device state in connection with the user device being found or recovered. In this way, the communication capabilities of the user device may be restored when the user device is recovered.

FIGS. 3A-3D are diagrams illustrating an example 300 associated with disablement and recovery for a lost or stolen user device, in accordance with the present disclosure. As shown in FIGS. 3A-3D, example 300 includes a user device, a network entity, a theft/recovery server, and a client device.

The user device may be a UE (e.g., UE 120), a cellular/mobile phone (e.g., a smart phone), a PDA, a wireless communication device, a handheld device, a laptop computer, a tablet, a camera, a wearable device (e.g., a smart watch, smart clothing, smart glasses, a smart wristband, smart jewelry (e.g., a smart ring or a smart bracelet)), a gaming device, a medical device, a biometric device, an entertainment device (e.g., a music device, a video device, and/or a satellite radio), a vehicle (e.g., a smart car), a vehicular component or sensor, a smart meter/sensor, industrial manufacturing equipment, a global positioning system device, an IoT device, or a similar type of device.

The network entity may be a base station (e.g., base station 110), AP, TRP, CU, DU, RU, or a combination thereof. The network entity may provide access to a wireless communication network. The theft/recovery server may include a communication device and/or a computing device. For example, the theft/recovery server may include a server, such as an application server, a client server, a web server, a database server, a host server, a proxy server, a virtual server (e.g., executing on computing hardware), or a server in a cloud computing system. In some aspects, the theft/recovery server may provide a service relating to disabling and recovering lost or stolen user devices. In some aspects, the theft/recovery server may be an edge server at an edge of a wireless communication network (e.g., the wireless communication network associated with the network entity), and the theft/recovery server may provide the service as an edge service. In some aspects, the theft/recovery server may be a server associated with and/or controlled by a mobile network operator (MNO) of the wireless communication network.

The client device may include a communication device and/or a computing device. For example, the client device may be or may include a UE (e.g., UE 120), a wireless communication device, a cellular/mobile phone (e.g., a smart phone), a laptop computer, a tablet, a desktop computer, a wearable device (e.g., a smart watch, smart glasses, a head mounted display, or a virtual reality headset), or a similar type of device.

Figure 3A:
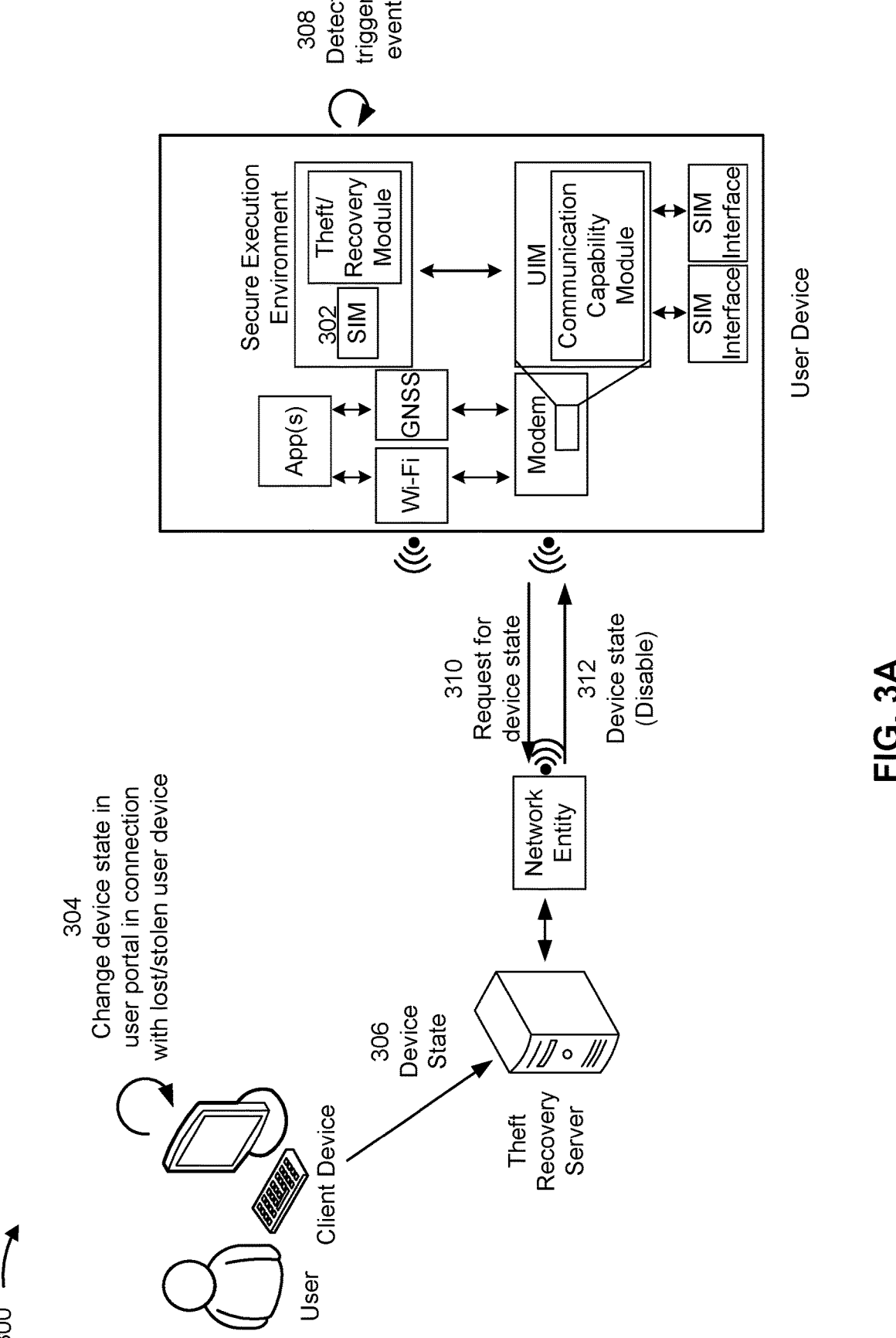
FIGS. 3A-3D are diagrams illustrating an example associated with disablement and recovery for a lost or stolen user device, in accordance with the present disclosure.

The user device may include one or more SIM interfaces. For example, as shown in FIG. 3A, the user device may include two SIM interfaces (e.g., a first SIM interface and a second SIM interface). Each SIM interface may accommodate a respective SIM card with an associated subscription. For example, one SIM interface may accommodate a first SIM card, and the other SIM interface may accommodate a second SIM card. The first SIM card may be a first MNO SIM (e.g., MNO SIM1) associated with a first MNO subscription, and the second SIM card may be a second MNO SIM associated with a second MNO subscription (e.g., MNO SIM 2). In some aspects, the SIM interfaces may be International Organization for Standardization (ISO) 7816 interfaces.

As shown in FIG. 3A, a modem of the user device may include a user identity module (UIM). The UIM may be a modem software component that interfaces with the SIM cards via the SIM interfaces (e.g., the ISO 7816 interfaces).

In some aspects, the UIM may include a communication capability module. The communication capability module may be a software component that performs disabling and/or enabling of communication capabilities of the user device (e.g., disabling and/or enabling of communication interfaces of the user device). For example, the communication capability module may be implemented as instructions or code stored in a memory or non-transitory computer-readable medium and executable by a controller or a processor to perform the functions or operations described herein. In some aspects, the communication capability module may disable and/or enable the SIM interfaces of the user device (e.g., disable and/or enable cellular communications using the subscriptions associated with the SIM cards in the SIM interfaces). The communication capability module may also enable or disable other communication capabilities (e.g., Wi-Fi, GNSS, and/or Bluetooth, among other examples) of the user device.

As shown in FIG. 3A, the user device may include a Wi-Fi interface (e.g., that provides a Wi-Fi capability) and a GNSS interface (e.g., that provides a GNSS capability). For example, the GNSS interface may be a GPS interface that provides a GPS capability. Additionally, or alternatively, the user device may include other communication interfaces, such as a Bluetooth interface (e.g., providing a Bluetooth capability), and/or one or more peripheral connections or ports (e.g., a USB port) for connecting the user device to other devices, among other examples. As shown in FIG. 3A, the user device may include one or more software applications (or "apps") that allow for a user to manually activate or deactivate the Wi-Fi, GNSS, and/or other communication capabilities (e.g., Bluetooth) of the user device.

As shown in FIG. 3A, the user device may include an integrated SIM 302. The integrated SIM 302 may be a SIM integrated with (e.g., embedded in) the user device. The integrated SIM 302 may not be physically removeable from the user device. The integrated SIM 302 may have a corresponding subscription associated with the integrated SIM 302. For example, the integrated SIM 302 may include an integrated circuit, embedded within (and not physically removeable from) the user device, that stores an IMSI and a related security key that identifies the subscription associated with the integrated SIM 302. The integrated SIM 302 may provide network connectivity for the user device, even in cases in which the SIM interfaces (e.g., SIM card slots) and Wi-Fi are disabled for the user device. In some aspects, the subscription associated with the integrated SIM 302 may be a small IoT-like and/or low cost subscription that the user device can invoke to provide network connectivity to communicate with the theft/recovery server (e.g., the server managing the subscription) without using the SIM interfaces.

In some aspects, the integrated SIM 302 may be included in a secure execution environment. The secure execution environment may include processor components (e.g., one or more processors) and memory components (e.g., a memory) within the secure execution environment. The memory components included in the secure execution environment may store software that is executable by the processor components included in the secure execution environment. The secure execution environment may provide software security that protects the software stored in the secure execution environment and/or security (e.g., via a secure casing) that protects the hardware (e.g., the integrated SIM 302, processing components, and memory components) included in the secure execution environment. For example, the secure execution environment may provide Common Criteria certified and/or Federal Information Processing Standard (FIPS) certified hardware and/or software security. In some aspects, the integrated SIM 302 and the secure execution environment may be integrated into a system on chip (SoC) of the user device (e.g., on an integrated circuit with other components of the user device). For example, the secure execution environment may include a secure processor unit (SPU) that is a certified secure element in the SoC, and the integrated SIM 302 may be included in the SPU.

In some aspects, the secure execution environment may include a theft/recovery module. The theft/recovery module may be a software module (or application) that is stored and executed in the secure execution environment. For example, the theft/recovery module may be implemented as instructions or code stored in a memory or non-transitory computer-readable medium within the secure execution environment and executable by a controller or a processor within the secure execution environment to perform the functions or operations described herein. In some aspects, the theft/recovery module may include instructions and/or logic to activate and deactivate the subscription associated with the integrated SIM 302. In some aspects, the theft/recovery module may control the user device to communicate with the theft/recovery server to retrieve a device state of the user device. In some aspects, the theft/recovery module may send commands to the UIM to disable or enable communication capabilities of the user device based at least in part on the device state of the user device.

As shown in FIG. 3A, and by reference number 304, a user (e.g., owner) of the user device may change a device state of the user device in a user portal, in connection with the user device being lost or stolen. The user portal may be a portal with the theft/recovery server. In some aspects, the user portal may be displayed in a web browser or another application executing on the client device. In a case in which the user device is lost or stolen, the user may input the change to the device state of the user device to the user portal via an input component (e.g., a keyboard, mouse, touchscreen, or the like) of the client device. In some aspects, the user portal may display a prompt for the user to select a device state of the user device from a plurality of device states. For example, the plurality of device states may include a "normal" device state associated with a user device that is not lost or stolen and one or more device states associated with a lost or stolen user device. In some aspects, the device states associated with a lost or stolen user device may include a "disable" device state and a "erase and disable" device state. In this case, the user may input, to the user portal (via the client device), a selection of the "disable" device state (e.g., a change from the "normal" device state to the "disable" device state) or a selection of the "erase and disable" device state (e.g., a change from the "normal" device state to the "erase and disable" device state) when the user device is lost or stolen. For example, the user may input a selection of the "disable" device state to indicate that communication capabilities of the user device are to be disabled. The user may input a selection of the "erase and disable" device state (e.g., in a case in which sensitive data is stored on the user device) to indicate that the data stored on the user device is to be erased and the communication capabilities of the user device are to be disabled.

As shown by reference number 306, the client device may transmit an indication of the device state input to the user portal to the theft/recovery server. The theft/recovery server may store a current device state for the user device (and for other user devices for which the disablement and recovery service is being provided). The theft/recovery server may receive, from the client device, the indication the device state resulting from the change to the device state of the user device, and the theft/recovery server may update the current device state stored for the user device.

As shown by reference number 308, the user device may detect a trigger event associated with retrieving the device state of the user device. In some aspects, the user device may periodically retrieve the current device state of the user device from the theft/recovery server. For example, the trigger event for retrieving the current device state of the user device may be the expiration of a polling timer of a certain time duration. In this case, based at least in part on detecting that the polling timer has expired, the user device may retrieve the current device state from the theft/recovery server, and the user device may reset the polling timer each time the user device retrieves the current device state from the theft/recovery server. In some aspects, the theft/recovery module in the secure execution environment may run the polling timer and control the user device to retrieve the device state as part of a polling algorithm to determine the device state indicated by the theft/recovery server.

In some aspects, the trigger event associated with retrieving the device state from the theft/recovery server may be based at least in part on a power cycle of the user device. For example, the user device may be triggered to retrieve the device state from the theft/recovery server each time the device is powered on after being powered off. In some aspects, the trigger event may be based at least in part on detecting user activity by the user device. For example, the user device may detect the trigger event associated with retrieving the device state from the theft/recovery server in connection with detecting user activity (e.g., detecting a screen swipe or a key press, among other examples) after the user device being idle for a time duration that satisfies a threshold. In some aspects, the theft/recovery module in the secure execution environment may detect whether the trigger event had occurred, and the theft/recovery module may control the user device to retrieve the device state from the theft/recovery server based at least in part on detecting the trigger event.

As shown by reference numbers 310 and 312, the user device may retrieve the current device state of the user device from the theft/recovery server based at least in part on detecting the trigger event. As shown by reference number 310, the user device may transmit a request for the device state to the theft/recovery server, via the network entity. The theft/recovery server may receive the request for the device state from the user device, via the network entity. As shown by reference number 312, the theft/recovery server, in connection with receiving the request for the device state, may transmit an indication of the current device state (stored on the theft/recovery server) of the user device to the user device, via the network entity. The user device may receive the indication of the current device state from the theft/recovery server, via the network entity.

In some aspects, when the user device is operating in a default mode associated with the "normal" device state, with the communication capabilities of the user device enabled, the user device may communicate with the theft/recovery server, via the network entity, using one or more subscriptions (e.g., MNO SIM1 or MNO SIM2) associated with one or more SIM cards in one or more SIM interfaces. In some cases, the user device may attempt to communicate with the theft/recovery server to retrieve the device state using the subscription(s) associated with the SIM card(s) in the SIM interface(s), but the user device may fail to connect with the theft/recovery server (e.g., due to some restrictions on the MNO SIM subscription or because the user device is not able to acquire network connectivity because there are no SIM cards inserted in the SIM interfaces). In some aspects, the user device may connect with the theft/recovery server, to retrieve the indication of the current device state of the user device, using the subscription associated with the integrated SIM included in the secure execution environment, based at least in part on a failure to connect with the theft/recovery server using a subscription associated with a SIM interface. For example, the theft/recovery module based at least in part on failing to connect the user device to the theft/recovery server using an MNO SIM associated with a SIM interface, may activate the subscription associated with the integrated SIM 302 and instruct the UIM to use the subscription associated with the integrated SIM 302 to communicate with the theft/recovery server. In this way, the user device may retrieve the device state, even when the user device cannot establish a connection using the MNO SIM associated with a SIM interface.

In some aspects, when the user device is operating in the default mode associated with the "normal" device state, the current device state retrieved by the user device may be the "normal" device state associated with the user device not being lost or stolen. In this case, the user device may continue operating in the default mode with the communication capabilities of the user device enabled.

In some aspects, when the user device is operating in the default mode associated with the "normal" device state, the current device state retrieved by the user device may be the "disable" device state (as shown in FIG. 3A) or the "erase and disable" device state. The user device may perform a disablement procedure (e.g., shown by reference numbers 314-320 of FIG. 3B) in connection with the current device state being the "disable" device state.

Figure 3B:
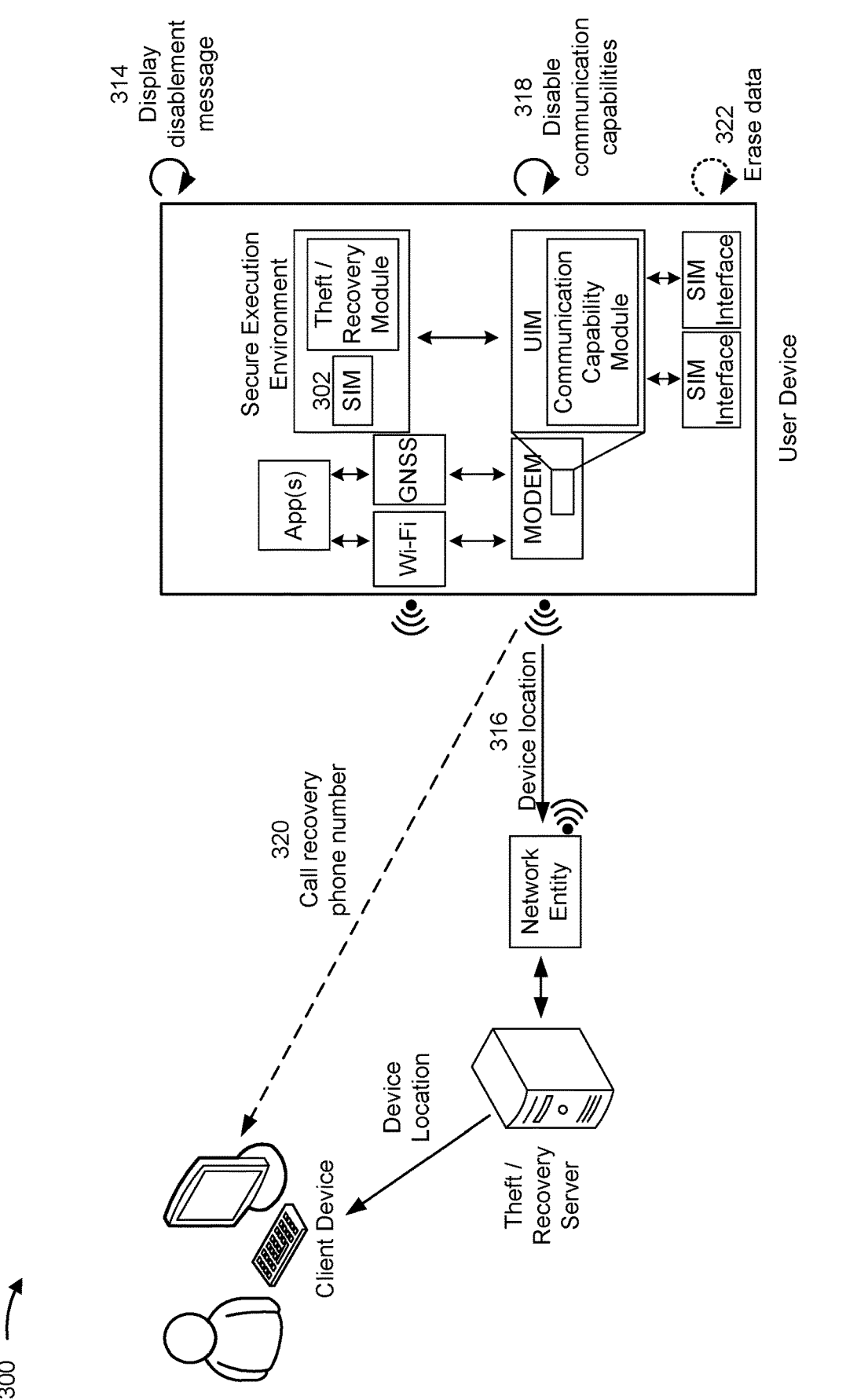

As shown in FIG. 3B, and by reference number 314, the user device, based at least in part on a determination that the current device state is the "disable" device state (or the "erase and disable" device state), may display a disablement message on a display (e.g., screen) of the user device. For example, the disablement message may indicate that the user device has been disabled, the user device is unusable, the user device is faulty, the user device is stolen, and/or to return the user device for service, among other examples. In some aspects, the theft/recovery module may control a display of the user device to display the disablement message in connection with the determination that the current device state is the "disable" device state (or the "erase and disable" device state).

As shown by reference number 316, in connection with the determination that the current device state is the "disable" device state (or the "erase and disable" device state), the user device may determine the current location of the device using the GNSS (e.g., the GPS), and the user device may transmit the current location of the user device to the theft/recovery server (via the network entity). The theft/recovery server may transmit the current location of the user device to the client device, via the user portal, in order to provide the current location of the user device to the user. For example, the user may then report the current location of the user device to the police.

As shown by reference number 318, the user device, in connection with the determination that the current device state is the "disable" device state (or the "erase and disable" device state), may disable communication capabilities of the user device. For example, the user device may disable the communication capabilities of the user device after the current location of the device is transmitted to the theft/recovery server. In some aspects, the user device may disable the SIM interfaces (e.g., SIM card slots) of the user device. For example, the theft/recovery module may instruct the UIM of the modem to disable the SIM interfaces, and the communication capability module may disable the SIM interfaces. Disabling the SIM interfaces (e.g., the SIM card slots) may result in the user device operating in a limited service mode with no internet connection, no voice over internet protocol (VOIP), no voice calls. In such a limited service mode, only emergency calls can occur. In some aspects, the user device may disable the Wi-Fi, GNSS (e.g., GPS), Bluetooth, peripheral connections (e.g., USB ports), and/or other communication capabilities of the user device. For example, the theft/recovery module may instruct the UIM of the modem to disable the Wi-Fi, GNSS, Bluetooth, and peripheral connections, and the communication capability module may disable the Wi-Fi, GNSS, Bluetooth, and peripheral connections. In some aspects, the user device (e.g., the theft/recovery module and/or the communication capability module) may also disable activation of the communication capabilities (e.g., activation of the SIM interfaces, the Wi-Fi, the GNSS, and/or the Bluetooth, among other examples) by one or more applications executing on the user device. In this way, the person in possession of the user device may be prevented from manually enabling the communication capabilities using an application (e.g., a "settings" application, or the like).

As shown by reference number 320, in some aspects, the user device may call a recovery phone number in connection with the determination that the current device state is the "disable" device state (or the "erase and disable" device state). For example, the recovery phone number may be a phone number associated with the user of the user device. In some aspects, the indication of the current device state retrieved from the theft/recovery server may include a setting of the recovery phone number. The recovery phone number may be a phone number programmed into the user device to attempt to recover the user device for the user. In some aspects, the user device may call the recovery phone number when the user device is powered up with no SIM, Wi-Fi, and/or other communication capabilities, using a network connection provided by the subscription associated with the integrated SIM 302. For example, the user device may call the recovery number when powered up, when a current device state is retrieved, when input to the user device (e.g., a screen swipe or key press) is detected, and/or periodically, while in the "disable" device state (or the "erase and disable" device state). This may allow the user to offer a reward and/or request the return of the user device, among other examples. In some aspects, the setting of the recovery phone number may include an indication of the recovery phone number and/or an indication of when the user device is to call the recovery phone number. For example, the recovery number and/or the indication of when the user device is to call the recovery phone number may be indicated, by the user, in the user portal (e.g., via the client device). In this case, the user device may call the recovery phone number based at least in part on the setting of when to call the recovery phone number.

As further shown in FIG. 3B, and by reference number 322, the user device may erase data stored on the user device. For example, the user device may erase data stored on the user device based at least in part on a determination that the current device state is the "erase and disable" device state. In some aspects, the user device may perform a crypto erase procedure to erase data stored on the user device. In some aspects, sensitive data may be stored in memory components protected by the secure execution environment, and the user device (e.g., the theft/recovery module) may perform the crypto erase procedure to erase the sensitive data protected by the secure execution environment.

Figure 3C:
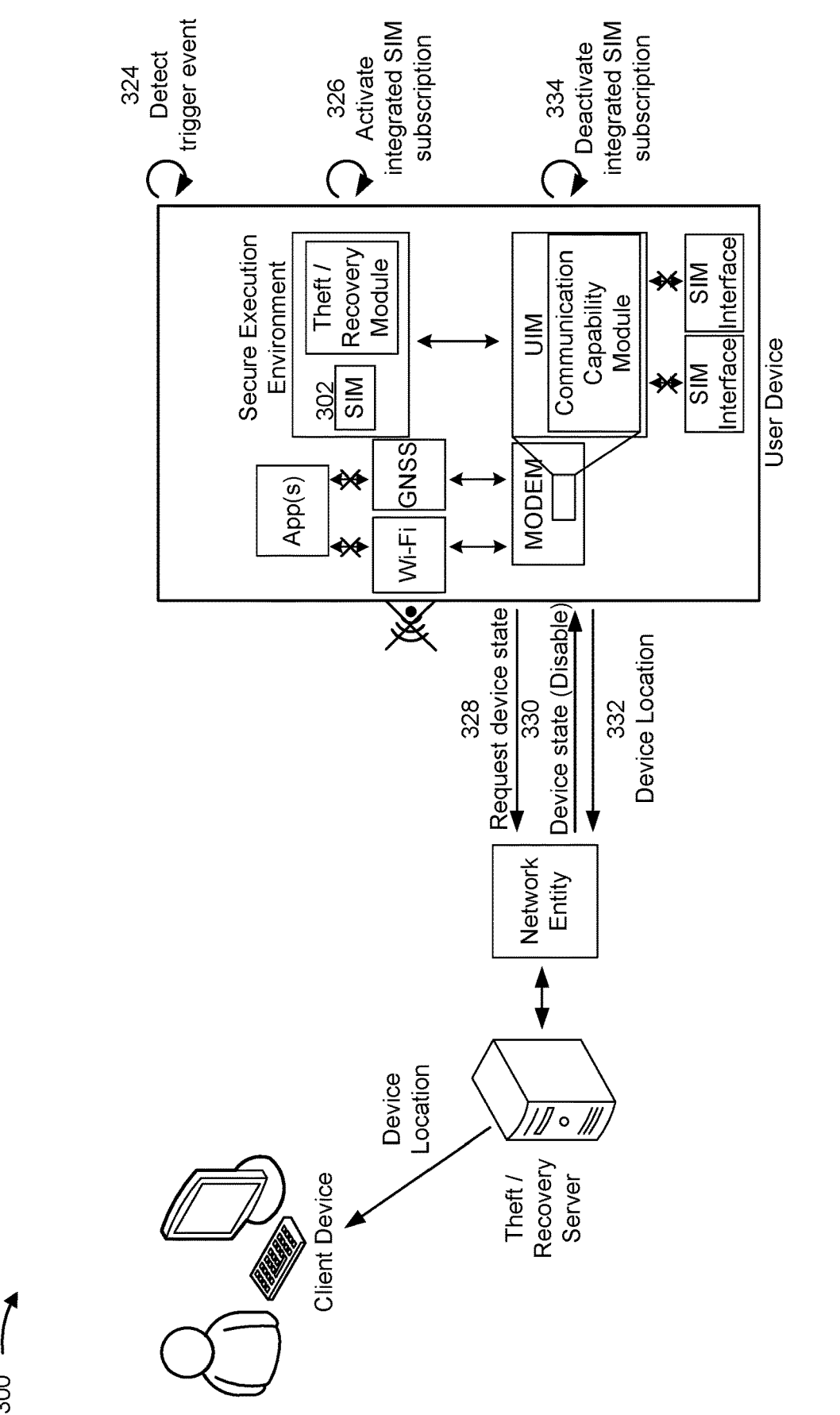

As shown in FIG. 3C, and by reference number 324, the user device, with the communication capabilities disabled (e.g., in the "disable" device state or the "erase and disable" device state), may detect a trigger event associated with retrieving the current device state from the theft/recovery server. For example, the user device (e.g., the theft/recovery module) may detect the trigger event as described above in connection with reference number 308.

As shown by reference number 326, the user device may activate the subscription associated with the integrated SIM 302. For example, the user device, based at least in part on detecting the trigger event, may temporarily activate the subscription associated with the integrated SIM to provide network connectivity, to be used by the user device to communicate with the theft/recovery server to retrieve the current device state. In some aspects, the theft/recovery module may instruct the UIM of the modem to initialize the integrated SIM 302 for full service in order to allow the theft/recovery module to control the UE to establish a connection with the theft/recovery server.

As shown by reference numbers 328 and 330, the user device may retrieve the current user state of the user device from the theft/recovery server. As shown by reference number 328, the user device may transmit a request for the device state to the theft/recovery server, via the network entity. The theft/recovery server may receive the request for the device state from the user device, via the network entity. As shown by reference number 330, the theft/recovery server, in connection with receiving the request for the device state, may transmit an indication of the current device state of the user device to the user device, via the network entity. The user device may receive the indication of the current device state from the theft/recovery server, via the network entity. In some aspects, the user device may retrieve the indication of the device state of the user device using the network connectivity provided by temporarily activating the subscription associated with the integrated SIM 302. For example, the user device may transmit the request and receive the indication of the device state using the network connectivity provided by the subscription associated with the integrated SIM 302.

As shown in FIG. 3C, in some aspects, the indication of the device state retrieved from the theft/recovery server may indicate that the current device state is still the "disable" device state (or the "erase and disable" device state). As shown by reference number 332, in connection with a determination that the current device state is still the "disable" device state (or the "erase and disable" device state) when the communication capabilities of the user device are disabled, the user device may temporarily enable the GNSS to determine the current location of the user device, and the user device may transmit an indication of the current location of the user device to the theft/recovery server. For example, the user device may transmit the current location of the user device to the theft/recovery server using the network connectivity provided by temporarily activating the subscription associated with the integrated SIM 302. The user device may then disable the GNSS capability again. For example, the theft/recovery module may instruct the UIM (e.g., the communication capability module) to temporarily enable the GNSS and then disable the GNSS again. The theft/recovery server may transmit the current location of the user device to the client device via the user portal.

As shown by reference number 334, the user device, in connection with the determination that the current device state is still the "disable" device state (or the "erase and disable" device state), may deactivate the subscription associated with the integrated SIM 302. For example, the user device may deactivate the subscription associated with the integrated SIM 302 and return to the limited service mode after transmitting the current device location to the theft/ recovery server.

Figure 3D:
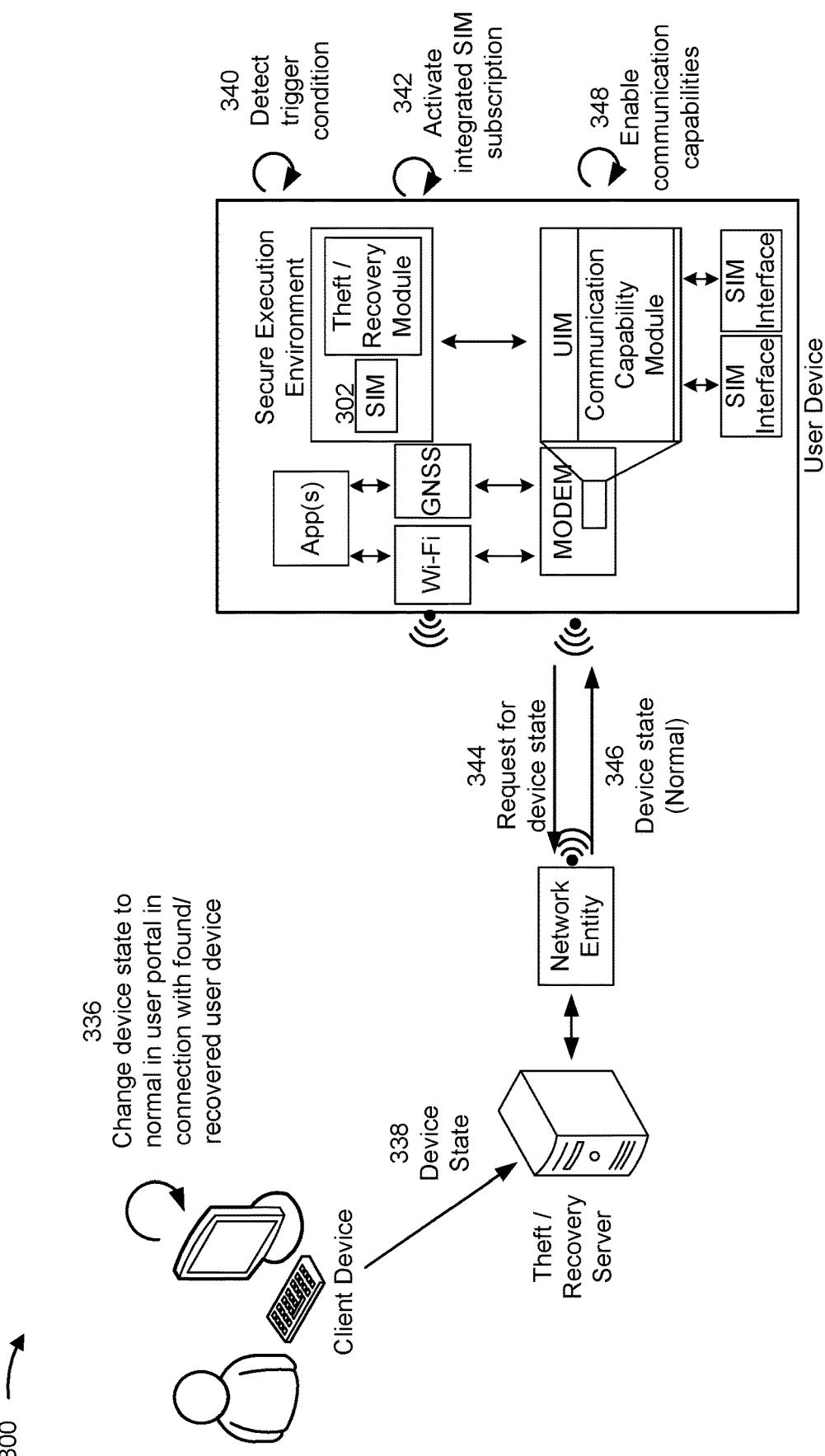

As shown in FIG. 3D, and by reference number 336, the user (e.g., owner) of the user device may change the device state of the user device in the user portal (e.g., via the client device), in connection with the user device being found or recovered. For example, the user may input, to the user portal (via the client device), a selection of the "normal" device state (e.g., a change to "normal" device state from the "disable" device state or the "erase and disable" device state) when the user device is found or recovered. As shown by reference number 338, the client device may transmit an indication of the device state, input to the user portal, to the theft/recovery server. The theft/recovery server may receive, from the client device, the indication of the device state resulting from the change to the device state of the user device (e.g., to the "normal" device state), and the theft/ recovery server may update the current device state stored for the user device.

As shown by reference number 340, the user device, with the communication capabilities disabled (e.g., in the "disable" device state or the "erase and disable" device state), may detect a trigger event associated with retrieving the current device state from the theft/recovery server. For example, the user device (e.g., the theft/recovery module) may detect the trigger event as described above in connection with reference number 308.

As shown by reference number 342, the user device may activate the subscription associated with the integrated SIM 302. For example, the user device, based at least in part on detecting the trigger event, may temporarily activate the subscription associated with the integrated SIM to provide network connectivity, to be used by the user device to communicate with the theft/recovery server to retrieve the current device state, as described above in connection with reference number 326.

As shown by reference numbers 344 and 346, the user device may retrieve the current user state of the user device from the theft/recovery server. As shown by reference number 344, the user device may transmit a request for the device state to the theft/recovery server, via the network entity. The theft/recovery server may receive the request for the device state from the user device, via the network entity. As shown by reference number 346, the theft/recovery server, in connection with receiving the request for the device state, may transmit an indication of the current device state (stored on the theft/recovery server) of the user device to the user device, via the network entity. The user device may receive the indication of the current device state from the theft/recovery server, via the network entity. In some aspects, the user device may retrieve the indication of the device state of the user device using the network connectivity provided by temporarily activating the subscription associated with the integrated SIM 302. For example, the user device may transmit the request and receive the indication of the device state using the network connectivity provided by the subscription associated with the integrated SIM 302.

As shown in FIG. 3D, in some aspects, the indication of the device state retrieved from the theft/recovery server may indicate that the current device state (e.g., an updated device state from a previous device state retrieved from the theft/ recovery server) is the "normal" device state (e.g., the device state of the user device has changed from the "disable" device state or the "erase and disable" device state to the "normal" device state). As shown by reference number 348, the user device, in connection with the determination that the updated device state of the user device is the "normal" device state, may enable the communication capabilities of the user device. For example, the user device may enable the SIM interfaces (e.g., the SIM card slots), the Wi-Fi, the GNSS, the Bluetooth, and/or the peripheral connections (e.g., the USB ports). In some aspects, the theft/recovery module may instruct the UIM of the modem to enable the communication capabilities (e.g., the SIM interfaces, the Wi-Fi, the GNSS, the Bluetooth, and/or the peripheral connections), and the communication capability module may enable the communication capabilities (e.g., the SIM interfaces, the Wi-Fi, the GNSS, the Bluetooth, and/or the peripheral connections). In some aspects, the user device may also enable activation (and/or deactivation) of communication capabilities, such as the SIM interfaces, the Wi-Fi, the GNSS, and/or the Bluetooth via one or more applications executing on the user device.

As indicated above, FIGS. 3A-3D are provided as an example. Other examples may differ from what is described with respect to FIGS. 3A-3D.

Figure 4:
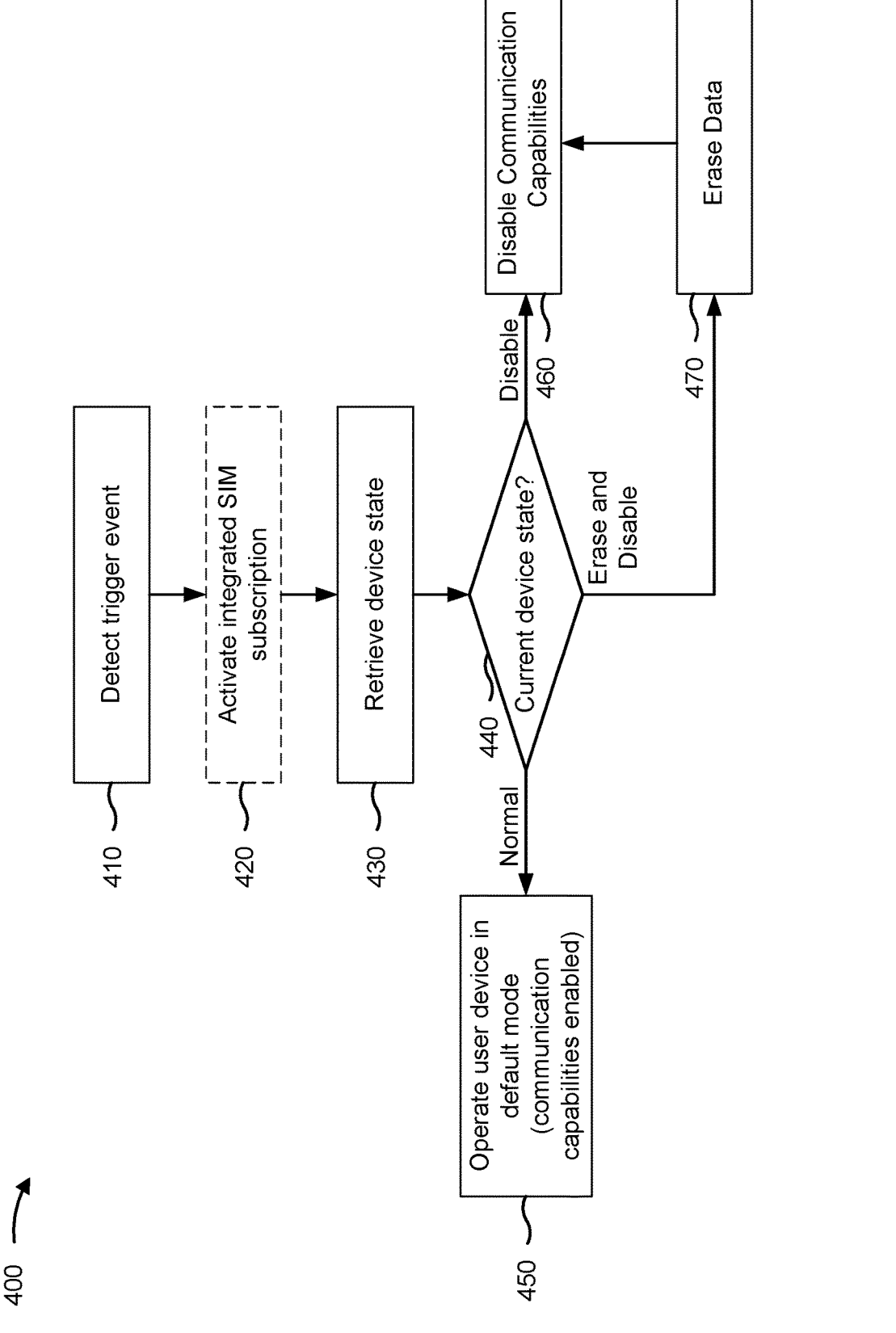
FIGS. 4-5 are diagrams illustrating example processes associated with disablement and recovery for a lost or stolen user device, in accordance with the present disclosure.

FIG. 4 is a diagram illustrating an example process 400 performed, for example, by a user device, in accordance with the present disclosure. Example process 400 is an example where the user device (e.g., the user device described in connection with FIGS. 3A-3D) performs operations associated with disablement and recovery for a lost or stolen user device.

As shown in FIG. 4, in some aspects, process 400 may include detecting a trigger event (block 410). For example, the user device may detect a trigger event associated with retrieving a current device state, as described above.

As further shown in FIG. 4, in some aspects, process 400 may include activating an integrated SIM subscription (block 420). In some aspects, in a case in which the user device is operating in a default mode with communication capabilities enabled, the user device may activate the subscription associated with the integrated SIM in order to retrieve the device state based at least in part on a failure to connect with the theft/recovery server using a subscription associated with a SIM interface, as described above. In some aspects, in a case in which the user device is operating in a limited service mode with the communication capabilities disabled, the user device may temporarily activate the subscription associated with the integrated SIM to provide network connectivity to the user device, as described above.

As shown in FIG. 4, in some aspects, process 400 may include retrieving a device state (block 430). For example, the user device may retrieve a current device state of the user device from the theft/recovery server, as described above.

As shown in FIG. 4, in some aspects, process 400 may include determining which device state, of a plurality of device states, is the current device state of the user device (block 440). For example, the user device may determine whether the current device state of the user device is the "normal" device state, the "disable" device state, or the "erase and disable" device state, as described above.

As shown in FIG. 4, in some aspects, process 400 may include operating the user device in the default mode, in which the communication capabilities are enabled, based at least in part on a determination that that the current device state is the "normal" device state (block 450). In some aspects, in a case in which the user device was previously operating in the default mode (e.g., a previous device state was the "normal" device state), the user device may continue operating in the default mode with the communications enabled. In some aspects, in a case in which the communication capabilities of the user device were previously disabled (e.g., a previous device state was the "disable" device state or the "erase and disable" device state), the user device may enable the communication capabilities of the user device, as described above.

As shown in FIG. 4, in some aspects, process 400 may include disabling communication capabilities of the user device, based at least in part on a determination that the current device state is the "disable" device state (block 460). For example, the user device may perform a disablement procedure, in which communication capabilities of the user device are disabled, as described above.

As shown in FIG. 4, in some aspects, process 400 may include, based at least in part on a determination that the current device state is the "erase and disable" device state, erasing data stored on the user device (block 470) and disabling communication capabilities of the user device (block 460). For example, the user device may perform a crypto erase procedure to erase sensitive data stored on the user device, and the user device may perform the disablement procedure, in which communication capabilities of the user device are disabled, as described above.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
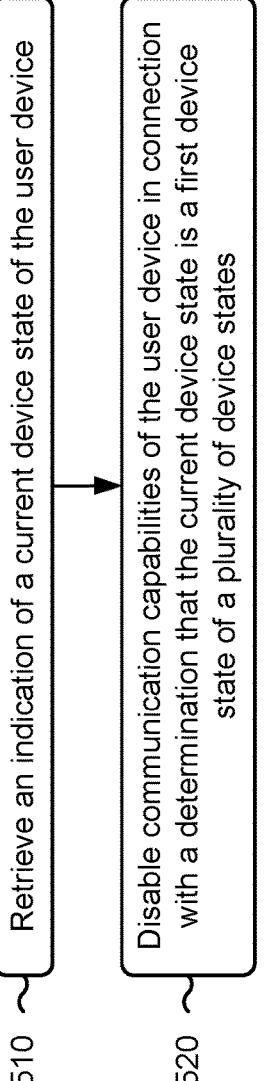

FIG. 5 is a diagram illustrating an example process 500 performed, for example, by a user device, in accordance with the present disclosure. Example process 500 is an example where the user device (e.g., the user device described in connection with FIGS. 3A-3D) performs operations associated with disablement and recovery for a lost or stolen user device.

As shown in FIG. 5, in some aspects, process 500 may include retrieving, from a server, an indication of a current device state of the user device (block 510). For example, the user device (e.g., using communication manager 140 and/or device state retrieval component 608, depicted in FIG. 6) may retrieve, from a server, an indication of a current device state of the user device, as described above.

As further shown in FIG. 5, in some aspects, process 500 may include disabling communication capabilities of the user device in connection with a determination that the current device state is a first device state of a plurality of device states (block 520). For example, the user device (e.g., using communication manager 140 and/or disablement component 610, depicted in FIG. 6) may disable communication capabilities of the user device in connection with a determination that the current device state is a first device state of a plurality of device states, as described above.

Process 500 may include additional aspects, such as any single aspect or any combination of aspects described below and/or in connection with one or more other processes described elsewhere herein.

In a first aspect, retrieving the indication of the current device state of the user device includes periodically retrieving the indication of the current device state of the user device from the server.

In a second aspect, retrieving the indication of the current device state of the user device includes retrieving the indication of the current device state of the user device based at least in part on detection of a trigger event.

In a third aspect, the trigger event is associated with at least one of a power cycle of the user device, a detection of user activity by the user device, or expiration of a polling timer.

In a fourth aspect, disabling the communication capabilities of the user device includes disabling one or more SIM interfaces of the user device, a Wi-Fi capability of the user device, a GNSS capability of the user device, and a Bluetooth capability of the user device.

In a fifth aspect, disabling the communication capabilities further includes disabling one or more peripheral connections of the user device.

In a sixth aspect, disabling the communication capabilities further includes disabling activation of the SIM interfaces of the user device, Wi-Fi, GNSS, and Bluetooth via one or more applications executing on the user device.

In a seventh aspect, process 500 includes transmitting a current location of the user device to the server prior to disabling the communication capabilities of the user device, based at least in part on the determination that the current device state is the first device state.

In an eighth aspect, retrieving the indication of the current device state of the user device includes connecting with the server, to retrieve the indication of the current device state of the user device, using a subscription associated with an integrated SIM of the user device, based at least in part on a failure to connect with the server using a subscription associated with a SIM interface of the user device.

In a ninth aspect, process 500 includes erasing data stored on the user device based at least in part on the determination that the current device state is the first device state.

In a tenth aspect, process 500 includes temporarily activating a subscription associated with an integrated SIM of the user device to provide network connectivity to the user device, and retrieving, from the server, an indication of an updated device state of the user device using the network connectivity provided by temporarily activating the subscription associated with the integrated SIM of the user device.

In an eleventh aspect, process 500 includes enabling the communication capabilities of the user device in connection with a determination that the updated device state is a second device state of the plurality of device states.

In a twelfth aspect, the communication capabilities include a GNSS capability, and further comprising, in connection with a determination that the updated device state is the first device state of the plurality of device states temporarily enabling the GNSS capability to determine a current location of the user device, transmitting, to the server, an indication of the current location of the user device using the network connectivity provided by temporarily activating the subscription associated with the integrated SIM of the user device, and disabling the GNSS capability and deactivating the subscription associated with the integrated SIM of the user device.

In a thirteenth aspect, the integrated SIM is included within a secure execution environment of the user device.

In a fourteenth aspect, the indication of the current device state includes a setting of a recovery phone number, and process 500 further includes calling the recovery phone number in connection with the determination that the current device state of the user device is the first device state of the plurality of device states.

In a fifteenth aspect, calling the recovery phone number includes calling the recovery phone number using a subscription associated with an integrated SIM of the user device.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
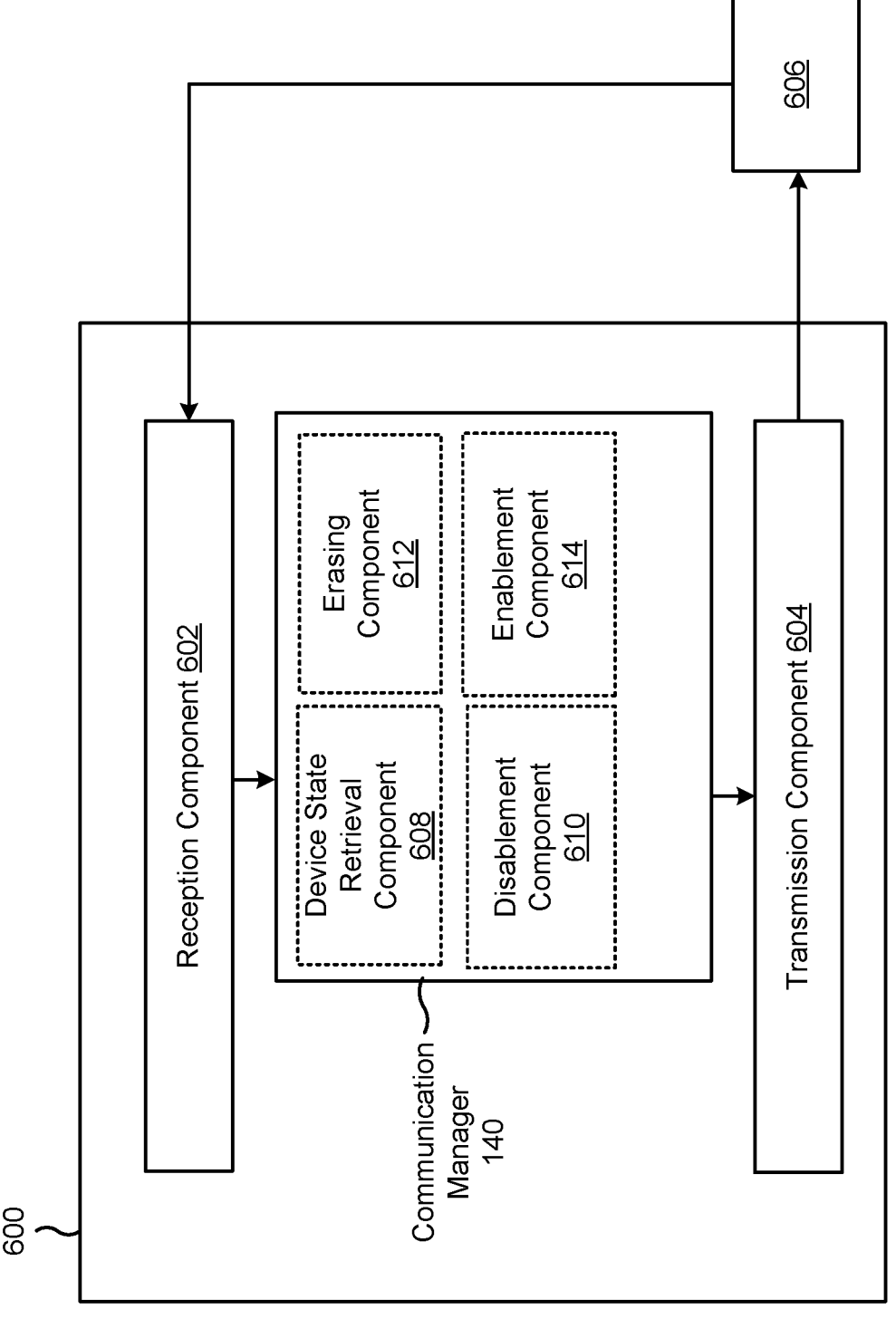
FIG. 6 is a diagram of an example apparatus for wireless communication, in accordance with the present disclosure.

FIG. 6 is a diagram of an example apparatus 600 for wireless communication. The apparatus 600 may be a user device, or a user device may include the apparatus 600. In some aspects, the apparatus 600 includes a reception component 602 and a transmission component 604, which may be in communication with one another (for example, via one or more buses and/or one or more other components). As shown, the apparatus 600 may communicate with another apparatus 606 (such as a UE, a base station, or another wireless communication device) using the reception component 602 and the transmission component 604. As further shown, the apparatus 600 may include the communication manager 140. The communication manager 140 may include one or more of a device state retrieval component 608, a disablement component 610, an erasing component 612, and/or an enablement component 614, among other examples.

In some aspects, the apparatus 600 may be configured to perform one or more operations described herein in connection with FIGS. 3A-3D. Additionally, or alternatively, the apparatus 600 may be configured to perform one or more processes described herein, such as process 400 of FIG. 4, process 500 of FIG. 5, or a combination thereof. In some aspects, the apparatus 600 and/or one or more components shown in FIG. 6 may include one or more components of the user device (e.g., UE 120) described in connection with FIG. 2 and/or one or more components of the user device described in connection with FIGS. 3A-3D. Additionally, or alternatively, one or more components shown in FIG. 6 may be implemented within one or more components described in connection with FIG. 2 and/or FIGS. 3A-3D. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 602 may receive communications, such as reference signals, control information, data communications, or a combination thereof, from the apparatus 606. The reception component 602 may provide received communications to one or more other components of the apparatus 600. In some aspects, the reception component 602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 600. In some aspects, the reception component 602 may include one or more antennas, a modem, a demodulator, a MIMO detector, a receive processor, a controller/processor, a memory, or a combination thereof, of the user device described in connection with FIG. 2.

The transmission component 604 may transmit communications, such as reference signals, control information, data communications, or a combination thereof, to the apparatus 606. In some aspects, one or more other components of the apparatus 600 may generate communications and may provide the generated communications to the transmission component 604 for transmission to the apparatus 606. In some aspects, the transmission component 604 may perform signal processing on the generated communications (such as filtering, amplification, modulation, digital-to-analog conversion, multiplexing, interleaving, mapping, or encoding, among other examples), and may transmit the processed signals to the apparatus 606. In some aspects, the transmission component 604 may include one or more antennas, a modem, a modulator, a transmit MIMO processor, a transmit processor, a controller/processor, a memory, or a combination thereof, of the user device described in connection with FIG. 2. In some aspects, the transmission component 604 may be co-located with the reception component 602 in a transceiver.

The device state retrieval component 608 may retrieve, from a server, an indication of a current device state of the user device. The disablement component 610 may disable communication capabilities of the user device in connection with a determination that the current device state is a first device state of a plurality of device states.

The transmission component 604 may transmit a current location of the user device to the server prior to disabling the communication capabilities of the user device, based at least in part on the determination that the current device state is the first device state.

The erasing component 612 may erase data stored on the user device based at least in part on the determination that the current device state is the first device state.

The device state retrieval component 608 may temporarily activate a subscription associated with an integrated SIM of the user device to provide network connectivity to the user device.

The device state retrieval component 608 may retrieve, from the server, an indication of an updated device state of the user device using the network connectivity provided by temporarily activating the subscription associated with the integrated SIM of the user device.

The enablement component 614 may enable the communication capabilities of the user device in connection with a determination that the updated device state is a second device state of the plurality of device states.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of (one or more) components shown in FIG. 6 may perform one or more functions described as being performed by another set of components shown in FIG. 6.

The following provides an overview of some Aspects of the present disclosure:

Aspect 1: A method of wireless communication performed by a user device, comprising: retrieving, from a server, an indication of a current device state of the user device; and disabling communication capabilities of the user device in connection with a determination that the current device state is a first device state of a plurality of device states.

Aspect 2: The method of Aspect 1, wherein retrieving the indication of the current device state of the user device comprises: periodically retrieving the indication of the current device state of the user device from the server.

Aspect 3: The method of any of Aspects 1-2, wherein retrieving the indication of the current device state of the user device comprises: retrieving the indication of the current device state of the user device based at least in part on detection of a trigger event.

Aspect 4: The method of Aspect 3, wherein the trigger event is associated with at least one of a power cycle of the user device, a detection of user activity by the user device, or expiration of a polling time.

Aspect 5: The method of any of Aspects 1-4, wherein disabling the communication capabilities of the user device comprises: disabling one or more subscriber identity module (SIM) interfaces of the user device, a Wi-Fi capability of the user device, a global navigation satellite system (GNSS) capability of the user device, and a Bluetooth capability of the user device.

Aspect 6: The method of Aspect 5, wherein disabling the communication capabilities further comprises: disabling one or more peripheral connections of the user device.

Aspect 7: The method of any of Aspects 5-6, wherein disabling the communication capabilities further comprises: disabling activation of the SIM interfaces of the user device, Wi-Fi, GNSS, and Bluetooth via one or more applications executing on the user device.

Aspect 8: The method of any of Aspects 1-7, further comprising: transmitting a current location of the user device to the server prior to disabling the communication capabilities of the user device, based at least in part on the determination that the current device state is the first device state.

Aspect 9: The method of any of Aspects 1-8, wherein retrieving the indication of the current device state of the user device comprises: connecting with the server, to retrieve the indication of the current device state of the user device, using a subscription associated with an integrated subscriber identity module (SIM) of the user device, based at least in part on a failure to connect with the server using a subscription associated with a SIM interface of the user device.

Aspect 10: The method of any of Aspects 1-9, further comprising: erasing data stored on the user device based at least in part on the determination that the current device state is the first device state.

Aspect 11: The method of any of Aspects 1-10, further comprising: temporarily activating a subscription associated with an integrated subscriber identity module (SIM) of the user device to provide network connectivity to the user device; and retrieving, from the server, an indication of an updated device state of the user device using the network connectivity provided by temporarily activating the subscription associated with the integrated SIM of the user device.

Aspect 12: The method of Aspect 11, further comprising: enabling the communication capabilities of the user device in connection with a determination that the updated device state is a second device state of the plurality of device states.

Aspect 13: The method of Aspect 11, wherein the communication capabilities include a global navigation satellite system (GNSS) capability, and further comprising, in connection with a determination that the updated device state is the first device state of the plurality of device states: temporarily enabling the GNSS capability to determine a current location of the user device; transmitting, to the server, an indication of the current location of the user device using the network connectivity provided by temporarily activating the subscription associated with the integrated SIM of the user device; and disabling the GNSS capability and deactivating the subscription associated with the integrated SIM of the user device.

Aspect 14: The method of any of Aspects 11-13, wherein the integrated SIM is included within a secure execution environment of the user device.

Aspect 15: The method of any of Aspects 1-14, wherein the indication of the current device state includes a setting of a recovery phone number, and wherein the method further comprises: calling the recovery phone number in connection with the determination that the current device state of the user device is the first device state of the plurality of device states.

Aspect 16: The method of Aspect 15, wherein calling the recovery phone number comprises: calling the recovery phone number using a subscription associated with an integrated subscriber identity module (SIM) of the user device.

Aspect 17: An apparatus for wireless communication at a device, comprising a processor; memory coupled with the processor; and instructions stored in the memory and executable by the processor to cause the apparatus to perform the method of one or more of Aspects 1-16.

Aspect 18: A device for wireless communication, comprising a memory and one or more processors coupled to the memory, the one or more processors configured to perform the method of one or more of Aspects 1-16.

Aspect 19: An apparatus for wireless communication, comprising at least one means for performing the method of one or more of Aspects 1-16.

Aspect 20: A non-transitory computer-readable medium storing code for wireless communication, the code comprising instructions executable by a processor to perform the method of one or more of Aspects 1-16.

Aspect 21: A non-transitory computer-readable medium storing a set of instructions for wireless communication, the set of instructions comprising one or more instructions that, when executed by one or more processors of a device, cause the device to perform the method of one or more of Aspects 1-16.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to imple- ment these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated other- wise. Also, as used herein, the term "or" is intended to be inclusive when used in a series and may be used inter- changeably with "and/or," unless explicitly stated otherwise (e.g., if used in combination with "either" or "only one of").

What is claimed is:

1. A user device for wireless communication, comprising: one or more memories; and
    one or more processors, coupled to the one or more memories, configured to cause the user device to:
        retrieve, from a server, an indication of a current device state of the user device based at least in part on detection of a trigger event, wherein the trigger event is associated with at least one of a key press or a screen swipe after the user device is idle for a time duration that satisfies a threshold; and
        disable, activation of communication capabilities of the user device by one or more applications executing on the user device, in connection with a determination by the user device that the current device state is a first device state of a plurality of device states, wherein the disabling prevents use of the one or more applications to activate the communication capabilities, wherein the plurality of device states comprise the first device state and a second device state, and wherein the second device state is selected by a user of the user device, indicates that data stored on the user device is to be erased, and indicates that the communication capabilities are to be disabled.

2. The user device of claim 1, wherein the one or more processors, to retrieve the indication of the current device state of the user device, are configured to cause the user device to:
    periodically retrieve the indication of the current device state of the user device from the server.

3. The user device of claim 1, wherein the one or more processors are configured to cause the user device to:
    disable the communication capabilities by disabling one or more subscriber identity module (SIM) interfaces of the user device, a Wi-Fi capability of the user device, a global navigation satellite system (GNSS) capability of the user device, and a Bluetooth capability of the user device.

4. The user device of claim 3, wherein the one or more processors, to disable the communication capabilities, are configured to cause the user device to:
    disable one or more peripheral connections of the user device.

5. The user device of claim 1, wherein the one or more processors are further configured to cause the user device to:
    transmit a current location of the user device to the server prior to disabling the communication capabilities, based at least in part on the determination by the user device that the current device state is the first device state.

6. The user device of claim 1, wherein the one or more processors are further configured to cause the user device to:
    erase the data stored on the user device based at least in part on the determination by the user device that the current device state is the first device state.

7. The user device of claim 1, further comprising:
    an integrated subscriber identity module (SIM).

8. The user device of claim 7, wherein the one or more processors, to retrieve the indication of the current device state of the user device, are configured to cause the user device to:
    connect with the server, to retrieve the indication of the current device state of the user device, using a sub- scription associated with the integrated SIM, based at least in part on a failure to connect with the server using a subscription associated with a SIM interface of the user device.

9. The user device of claim 7, wherein the one or more processors are further configured to cause the user device to:
    temporarily activate a subscription associated with the integrated SIM of the user device to provide network connectivity to the user device; and
    retrieve, from the server, an indication of an updated device state of the user device using the network connectivity provided by temporarily activating the subscription associated with the integrated SIM of the user device.

10. The user device of claim 9, wherein the one or more processors are further configured to cause the user device to:
    enable the communication capabilities in connection with a determination that the updated device state is a third device state, wherein the third device state is associated with the user device being found or recovered.

11. The user device of claim 9, wherein the communication capabilities include a global navigation satellite system (GNSS) capability, and wherein the one or more processors are further configured to, in connection with a determination that the updated device state is the first device state of the plurality of device states, cause the user device to:

temporarily enable the GNSS capability to determine a current location of the user device;

transmit, to the server, an indication of the current location of the user device using the network connectivity provided by temporarily activating the subscription associated with the integrated SIM of the user device; and disable the GNSS capability and deactivating the subscription associated with the integrated SIM of the user device.

12. The user device of claim 7, wherein the integrated SIM is included within a secure execution environment of the user device.

13. The user device of claim 1, wherein the indication of the current device state includes a setting of a recovery phone number, and wherein the one or more processors are further to cause the user device to:

call the recovery phone number in connection with the determination by the user device that the current device state of the user device is the first device state of the plurality of device states.

14. The user device of claim 13, wherein the one or more processors, to call the recovery phone number, are configured to cause the user device to:

call the recovery phone number using a subscription associated with an integrated subscriber identity module (SIM) of the user device.

15. The user device of claim 1, wherein the one or more processors, to disable the activation of the communication capabilities, prevent manual activation of the communication capabilities using a settings application of the user device, wherein the one or more applications comprise the settings application.

16. The user device of claim 1, wherein the one or more processors, to disable the activation of the communication capabilities, cause the user device to disable the activation of the communication capabilities after a current location of the user device is transmitted to a theft server or a recovery server.

17. The user device of claim 1, wherein the one or more processors, to disable activation of the communication capabilities by the one or more applications executing on the user device, cause the user device to disable manual activation of subscriber identity module (SIM) interfaces using a settings application of the user device, wherein the one or more applications comprise the settings application.

18. A method of wireless communication performed by a user device, comprising:

retrieving, from a server, an indication of a current device state of the user device based at least in part on detection of a trigger event, wherein the trigger event is associated with at least one of a key press or a screen swipe after the user device is idle for a time duration that satisfies a threshold; and disabling, activation of communication capabilities of the user device by one or more applications executing on the user device, in connection with a determination by the user device that the current device state is a first device state of a plurality of device states, wherein the disabling prevents use of the one or more applications to activate the communication capabilities, wherein the plurality of device states comprise the first device state and a second device state, and wherein the second device state is selected by a user of the user device, indicates that data stored on the user device is to be erased, and indicates that the communication capabilities of the user device are to be disabled.

19. The method of claim 18, further comprising:

disabling the communication capabilities by disabling one or more subscriber identity module (SIM) interfaces of the user device, a Wi-Fi capability of the user device, a global navigation satellite system (GNSS) capability of the user device, and a Bluetooth capability of the user device.

20. The method of claim 18, further comprising:

transmitting a current location of the user device to the server prior to disabling the communication capabilities, based at least in part on the determination by the user device that the current device state is the first device state.

21. The method of claim 18, wherein retrieving the indication of the current device state of the user device comprises:

connecting with the server, to retrieve the indication of the current device state of the user device, using a subscription associated with an integrated subscriber identity module (SIM) of the user device, based at least in part on a failure to connect with the server using a subscription associated with a SIM interface of the user device.

22. The method of claim 18, further comprising:

erasing the data stored on the user device based at least in part on the determination by the user device that the current device state is the first device state.

23. The method of claim 18, further comprising:

temporarily activating a subscription associated with an integrated subscriber identity module (SIM) of the user device to provide network connectivity to the user device; and retrieving, from the server, an indication of an updated device state of the user device using the network connectivity provided by temporarily activating the subscription associated with the integrated SIM of the user device.

24. The method of claim 23, further comprising:

enabling the communication capabilities in connection with a determination that the updated device state is a third device state, wherein the third device state is associated with the user device being found or recovered.

25. The method of claim 23, wherein the communication capabilities include a global navigation satellite system (GNSS) capability, and further comprising, in connection with a determination that the updated device state is the first device state of the plurality of device states:

temporarily enabling the GNSS capability to determine a current location of the user device;

transmitting, to the server, an indication of the current location of the user device using the network connectivity provided by temporarily activating the subscription associated with the integrated SIM of the user device; and disabling the GNSS capability and deactivating the subscription associated with the integrated SIM of the user device.

26. The method of claim 23, wherein the integrated SIM is included within a secure execution environment of the user device.

27. A non-transitory computer-readable medium storing a set of instructions for wireless communication, the set of instructions comprising:

one or more instructions that, when executed by one or more processors of a user device, cause the user device to:

retrieve, from a server, an indication of a current device state of the user device based at least in part on detection of a trigger event, wherein the trigger event is associated with at least one of a key press or a screen swipe after the user device is idle for a time duration that satisfies a threshold; and disable, activation of communication capabilities of the user device by one or more applications executing on the user device, in connection with a determination by the user device that the current device state is a first device state of a plurality of device states, wherein the disabling prevents use of the one or more applications to activate the communication capabilities, wherein the plurality of device states comprise the first device state and a second device state, and wherein the second device state is selected by a user of the user device, indicates that data stored on the user device is to be erased, and indicates that the communication capabilities are to be disabled.

28. An apparatus for wireless communication, comprising:

means for retrieving, from a server, an indication of a current device state based at least in part on detection of a trigger event, wherein the trigger event is associated with at least one of a key press or a screen swipe after the user device is idle for a time duration that satisfies a threshold; and means for disabling, activation of communication capabilities by one or more applications executing on the apparatus, in connection with a determination by the apparatus that the current device state is a first device state of a plurality of device states, wherein the disabling prevents use of the one or more applications to activate the communication capabilities, wherein the plurality of device states comprise the first device state and a second device state, and wherein the second device state is selected by a user of the apparatus, indicates that data stored on the apparatus is to be erased, and indicates that the communication capabilities are to be disabled.

* * * * *